US012671513B2

(12) United States Patent　　　　　(10) Patent No.: US 12,671,513 B2
Markovic et al.　　　　　　　　　　　(45) Date of Patent: *Jun. 30, 2026

(54) AIRFRAME TIMESTAMPING TECHNIQUE FOR POINT-TO-POINT RADIO LINKS

(71) Applicant: Aviat U.S., Inc., Austin, TX (US)

(72) Inventors: Tadej Markovic, Ljubljana (SI); Janez Mihelic, Ljubljana (SI)

(73) Assignee: Aviat U.S., Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,273

(22) Filed: Oct. 18, 2022

(65) Prior Publication Data

US 2023/0040503 A1　　Feb. 9, 2023

Related U.S. Application Data

(63) Continuation of application No. 17/121,491, filed on Dec. 14, 2020, now Pat. No. 11,476,963, which is a
(Continued)

(51) Int. Cl.
*H04J 3/06*　　　　(2006.01)
*H04L 7/033*　　　(2006.01)
(Continued)

(52) U.S. Cl.
CPC ......... *H04J 3/0667* (2013.01); *H04J 3/0638* (2013.01); *H04J 3/0697* (2013.01); *H04L 7/033* (2013.01);
(Continued)

(58) Field of Classification Search
None
See application file for complete search history.

(56) References Cited

U.S. PATENT DOCUMENTS 10,411,986 B2　　9/2019　Mihelic et al.
10,855,569 B2　　12/2020　Mihelic et al.
(Continued)

FOREIGN PATENT DOCUMENTS

EP　　　　3659362 B1　　9/2023
WO　　　2016181198　　11/2016
WO　　　2017107261　　6/2017

OTHER PUBLICATIONS

International Application No. PCT/US2018/043982, International Search Report and Written Opinion dated Oct. 15, 2018.
(Continued)

*Primary Examiner* — Clemence S Han
(74) *Attorney, Agent, or Firm* — Crowell & Moring LLP

(57) ABSTRACT

An example system comprising a first transceiver configured to receive a request airframe from a second transceiver over a wireless link, the request airframe including a first time indication indicating a first time TS1, a second time indication indicating a second time TS2 that the request airframe was received, generate a respond airframe and including a third time indication indicating a third time TS3 that the respond airframe is transmitted to the second transceiver, transmit the respond airframe to the second transceiver, provide a timestamp information request to second transceiver, receive a timestamp information response, the timestamp information response including a fourth time indication indicating a fourth time TS4, calculate a counter offset using the first time, second time, third time and fourth time as follows:

$$\text{counter offset} = \frac{(TS1 + TS4 - TS3 - TS2)}{2},$$

(Continued)

calculate a phase offset based on the counter offset, and correct a phase of the first transceiver.

20 Claims, 8 Drawing Sheets

Related U.S. Application Data continuation of application No. 16/046,877, filed on Jul. 26, 2018, now Pat. No. 10,868,623.

(60) Provisional application No. 62/537,378, filed on Jul. 26, 2017.

(51) Int. Cl.
H04L 27/26 (2006.01)
H04W 56/00 (2009.01)

(52) U.S. Cl.
CPC ..... H04L 27/2675 (2013.01); H04W 56/0055 (2013.01)

(56) References Cited

U.S. PATENT DOCUMENTS

| | | | |
|---|---|---|---|
| 10,868,623 B2 | 12/2020 | Markovic et al. | |
| 11,381,490 B2 | 7/2022 | Mihelic et al. | |
| 11,777,829 B2 | 10/2023 | Mihelic et al. | |
| 2005/0018762 A1 | 1/2005 | Aiello et al. | |
| 2007/0147562 A1* | 6/2007 | Eidson ................. | H04J 3/0667 |
| | | | 375/354 |
| 2010/0020829 A1 | 1/2010 | Ruffini | |
| 2010/0085989 A1 | 4/2010 | Belhadj et al. | |
| 2010/0115047 A1 | 5/2010 | Briscoe et al. | |
| 2010/0135334 A1 | 6/2010 | Briscoe et al. | |
| 2011/0153869 A1 | 6/2011 | Bryant et al. | |
| 2011/0296226 A1 | 12/2011 | Sorbara et al. | |
| 2012/0014377 A1 | 1/2012 | Joergensen et al. | |
| 2012/0020417 A1* | 1/2012 | Wei ......................... | H04L 7/041 |
| | | | 375/259 |
| 2013/0034197 A1 | 2/2013 | Aweya et al. | |
| 2013/0170507 A1 | 7/2013 | Hsueh et al. | |
| 2013/0195443 A1* | 8/2013 | Yin ....................... | H04J 3/0638 |
| | | | 398/25 |
| 2013/0301634 A1* | 11/2013 | Ehlers ................... | H04J 3/0664 |
| | | | 370/350 |
| 2014/0029633 A1* | 1/2014 | Hamamatsu .......... | H04J 3/0667 |
| | | | 370/509 |
| 2014/0043991 A1 | 2/2014 | Gupta | |
| 2014/0146811 A1* | 5/2014 | Wen ..................... | H04J 3/0667 |
| | | | 370/350 |
| 2014/0226984 A1 | 8/2014 | Roberts et al. | |
| 2014/0269672 A1* | 9/2014 | Zampetti ........... | H04W 56/0015 |
| | | | 370/350 |
| 2014/0307746 A1 | 10/2014 | Sasak et al. | |
| 2014/0362872 A1* | 12/2014 | Grenabo ............... | H04J 3/0667 |
| | | | 370/507 |
| 2015/0092796 A1 | 4/2015 | Aweya | |
| 2015/0092797 A1 | 4/2015 | Aweya | |
| 2015/0131766 A1* | 5/2015 | Chen ...................... | H03L 7/087 |
| | | | 375/372 |
| 2015/0229388 A1* | 8/2015 | Xu ........................ | H04L 7/0075 |
| | | | 398/29 |
| 2015/0295669 A1* | 10/2015 | Chapman .............. | H04L 27/345 |
| | | | 370/503 |
| 2015/0295836 A1* | 10/2015 | Welin .................... | H04W 56/00 |
| | | | 370/350 |
| 2016/0065358 A1 | 3/2016 | Zhang et al. | |
| 2016/0080100 A1* | 3/2016 | Yan ....................... | H04J 3/0688 |
| | | | 370/216 |
| 2016/0095075 A1* | 3/2016 | Bin Sediq ........... | H04W 56/001 |
| | | | 370/350 |
| 2016/0170439 A1 | 6/2016 | Aweya | |
| 2016/0170440 A1 | 6/2016 | Aweya | |
| 2016/0241381 A1 | 8/2016 | Mihelic | |
| 2016/0337062 A1* | 11/2016 | Ruffini ................. | H04J 3/0667 |
| 2017/0366287 A1* | 12/2017 | Zeng .................... | H04J 3/0667 |
| 2018/0048457 A1* | 2/2018 | Dzung ................. | H04J 3/0667 |
| 2018/0098330 A1 | 4/2018 | Nguyen et al. | |
| 2018/0146443 A1 | 5/2018 | Park et al. | |
| 2019/0028192 A1* | 1/2019 | Tsonev .............. | H04W 56/0005 |
| 2021/0083958 A1 | 3/2021 | Mihelic et al. | |
| 2024/0056375 A1 | 2/2024 | Mihelic et al. | |

OTHER PUBLICATIONS

International Application No. PCT/US2018/043972, International Search Report and Written Opinion dated Oct. 15, 2018, 9 pages.
Garner, Geoffrey M., "IEEE 802.1 AVB and Its Application in Carrier-Grade Ethernet [Standards Topics]", IEEE Communications Magazine, vol. 45, No. 12, Dec. 1, 2007 (Dec. 1, 2007), IEEE Service Center, Piscataway, U. S., XP011198459, pp. 126-134.
Han, Jiho, et al., "Practical Considerations in the Design and Implementation of Time Synchronization Systems Using IEEE 1588", IEEE Communications Magazine, vol. 47, No. 11, Nov. 1, 2009 (Nov. 1, 2009), IEEE Service Center, Piscataway, U.S., XP011284169, pp. 164-170.
Jahja, Rico Hartono, et al., "Improving IEEE 1588v2 Time Synchronization Performance with Phase Locked Loop", 2014 48th IEEE Asilomar Conference on Signals, Systems and Computers, IEEE, Nov. 2, 2014 (Nov. 2, 2014), KP032769245, pp. 252-257.
European Application No. 18839156.9, Communication under Rule 71(3) EPC (Intention to grant) dated Mar. 27, 2023.
U.S. Appl. No. 17/857,935, filed Jul. 5, 2022, Non-Final Office Action dated Feb. 14, 2023.
U.S. Appl. No. 17/857,935, filed Jul. 5, 2022, Notice of Allowance dated May 26, 2023.
Communication under Rule 71(3) EPC issued in European Patent Application No. 18837583.6, dated Sep. 1, 2023, pp. 1-9.

\* cited by examiner

AIRFRAME TIMESTAMPING TECHNIQUE FOR POINT-TO-POINT RADIO LINKS

CROSS-REFERENCE TO RELATED APPLICATIONS

The present application is a continuation of U.S. application Ser. No. 17/121,491 filed Dec. 14, 2020, and entitled "Airtime Timestamping Technique for Point-To-Point Radio Links", which is a continuation of U.S. application Ser. No. 16/046,877 filed Jul. 26, 2018, and entitled "Airtime Timestamping Technique for Point-To-Point Radio Links", now U.S. Pat. No. 10,868,623, which claims the benefit of U.S. Provisional Patent Application No. 62/537,378 filed Jul. 26, 2017, and entitled "Airtime Time Stamping Technique for Point-To-Point Radio Links at the PHY Level of Airframe Data" which is incorporated by reference herein.

BACKGROUND

1. Field of the Invention(s)

The present invention(s) generally relate to wireless receivers. More particularly, the invention(s) relate to systems and methods for determining time offsets and correcting phase between two devices communicating over a wireless channel.

2. Description of Related Art

A Radio Transparent Clock (R-TC) can be employed to deliver highly accurate time using the IEEE 1588 protocol over microwave links. The Radio Transparent Clock accounts for the packet delay variation and asymmetry of microwave link. Both quantities are crucial for IEEE 1588 timing accuracy but unfortunately also an inherent property of microwave radio interfaces.

Current synchronization techniques are capable of transferring frequency synchronization across the physical layers used to transport the data (electrical, optical or wireless) but to achieve phase synchronization algorithms like IEEE 1588v2 may be utilized. Unfortunately, the phase synchronization process at the packet level, as recommended by IEEE 1588v2, imposes several restrictions and complexities if used across wireless links.

SUMMARY OF THE INVENTION

An example method comprises receiving, at a first transceiver, a request airframe from a second transceiver over a wireless link of a network, the request airframe including a first timestamp indicating a first time TS1 that the request airframe was transmitted to the first transceiver, the first transceiver and the second transceiver including a first and second counters, respectively, timestamping a second time indication indicating a second time TS2 that the request airframe was received, generating a respond airframe and including within the respond airframe a third time indication indicating a third time TS3 that the respond airframe is to be transmitted to the second transceiver, transmitting the respond airframe to the second transceiver, providing, by the first transceiver, a timestamp information request to the second transceiver, receiving a timestamp information response, from the second transceiver, in response to the timestamp information request, the timestamp information response including a fourth time indication indicating a fourth time TS4, calculating, by the first transceiver, a counter offset using the first time, second time, third time, and fourth time as follows:

$$\text{counter offset} = \frac{(TS1 + TS4 - TS3 - TS2)}{2},$$

calculating, by the first transceiver, a phase offset based on the counter offset, and correcting, by the first transceiver, a phase of the first transceiver.

In various embodiments, the first and second counters are synchronized with each other before the counter offset is calculated. The first transceiver and the second transceiver may have synchronized frequencies. The first counter may be a PTP counter.

In some embodiments, the method further comprises determining asymmetry (ASY) in the wireless link and calculating the counter offset includes $$\frac{(TS1 + TS4 - TS3 - TS2)}{2} \pm \frac{Asy}{2}.$$

The first transceiver may generate and transmit the respond airframe immediately after receiving the request airframe. The first transceiver may transmit the timestamp information request to the second transceiver at any time after the respond airframe is received.

The method may further comprise providing, by the second transceiver, a timestamp information request to the first transceiver, receiving a timestamp information response from the first transceiver, in response to the timestamp information request, the timestamp information response including at least the second time indication, calculating, by the second transceiver, a counter offset using the first time, second time, third time, and fourth time as follows:

$$\text{counter offset} = \frac{(TS1 + TS4 - TS3 - TS2)}{2},$$

calculating, by the second transceiver, a phase offset based on the counter offset, and correcting, by the second transceiver, a phase of the second transceiver. Calculating the phase offset by the first transceiver may not be synchronized with calculating the phase offset by the second transceiver. The wireless link may be a microwave link.

Another example method includes generating, by a first transceiver, a request airframe to be sent to a second transceiver over a wireless link of a network, the request airframe including a first timestamp indicating a first time TS1 that the request airframe is to be transmitted by the first transceiver, the first transceiver and the second transceiver including a first and second counters, respectively, transmitting the request airframe to the second transceiver, receiving a respond airframe from the second transceiver, the respond airframe including within the respond airframe a third time indication indicating a third time TS3 that the respond airframe is to be transmitted to the first transceiver, determining a fourth time indication indicating a fourth time TS4 that the respond airframe was received, providing, by the first transceiver, a timestamp information request to the second transceiver, receiving a timestamp information response, from the second transceiver, in response to the timestamp information request, the timestamp information response including a second time indication indicating a second time TS2 that the request airframe was received by the second transceiver, calculating, by the first transceiver, a counter offset using the first time, second time, third time, and fourth time as follows:

$$\text{counter offset} = \frac{(TS1 + TS4 - TS3 - TS2)}{2},$$

calculating, by the first transceiver, a phase offset based on the counter offset, and correcting, by the first transceiver, a phase of the first transceiver.

The first and second counters may be synchronized with each other before the counter offset is calculated. The first transceiver and the second transceiver may have synchronized frequencies. The first counter may be a PTP counter. The method may further comprise determining asymmetry (ASY) in the wireless link and calculating the counter offset includes $$\frac{(TS1 + TS4 - TS3 - TS2)}{2} \pm \frac{Asy}{2}.$$

The first transceiver may transmit the timestamp information request to the second transceiver at any time after the respond airframe is received.

In various embodiments, the method may further comprise providing, by the second transceiver, a timestamp information request to the first transceiver, providing a timestamp information response to the second transceiver, in response to the timestamp information request, the time-stamp information response including at least the third time indication, calculating, by the second transceiver, a counter offset using the first time, second time, third time, and fourth time as follows:

$$\text{counter offset} = \frac{(TS1 + TS4 - TS3 - TS2)}{2},$$

calculating, by the second transceiver, a phase offset based on the counter offset; and correcting, by the second transceiver, a phase of the second transceiver.

Calculating the phase offset by the first transceiver may not be synchronized with calculating the phase offset by the second transceiver.

An example system may comprise a first transceiver including memory and a processor, the first transceiver configured to: receive a request airframe from a second transceiver over a wireless link of a network, the request airframe including a first timestamp indicating a first time TS1 that the request airframe was transmitted to the first transceiver, the first transceiver and the second transceiver including a first and second counters, respectively, time-stamp a second time indication indicating a second time TS2 that the request airframe was received, generate a respond airframe and including within the respond airframe a third time indication indicating a third time TS3 that the respond airframe is to be transmitted to the second transceiver, transmit the respond airframe to the second transceiver, provide a timestamp information request to the second transceiver, receive a timestamp information response, from the second transceiver, in response to the timestamp information request, the timestamp information response including a fourth time indication indicating a fourth time TS4, calculate a counter offset using the first time, second time, third time, and fourth time as follows:

$$\text{counter offset} = \frac{(TS1 + TS4 - TS3 - TS2)}{2},$$

calculate a phase offset based on the counter offset, and correct a phase of the first transceiver.

Another example system may comprise a first transceiver including memory and a processor, the first transceiver configured to: generate a request airframe to be sent to a second transceiver over a wireless link of a network, the request airframe including a first timestamp indicating a first time TS1 that the request airframe is to be transmitted by the first transceiver, the first transceiver and the second transceiver including a first and second counters, respectively, transmit the request airframe to the second transceiver, receive a respond airframe from the second transceiver, the respond airframe including within the respond airframe a third time indication indicating a third time TS3 that the respond airframe is to be transmitted to the first transceiver, determine a fourth time indication indicating a fourth time TS4 that the respond airframe was received, provide a timestamp information request to the second transceiver, receive a timestamp information response, from the second transceiver, in response to the timestamp information request, the timestamp information response including a second time indication indicating a second time TS2 that the request airframe was received by the second transceiver, calculate a counter offset using the first time, second time, third time, and fourth time as follows:

$$\text{counter offset} = \frac{(TS1 + TS4 - TS3 - TS2)}{2},$$

calculate a phase offset based on the counter offset, and correct a phase of the first transceiver.

DETAILED DESCRIPTION OF THE INVENTION

Figure 1:
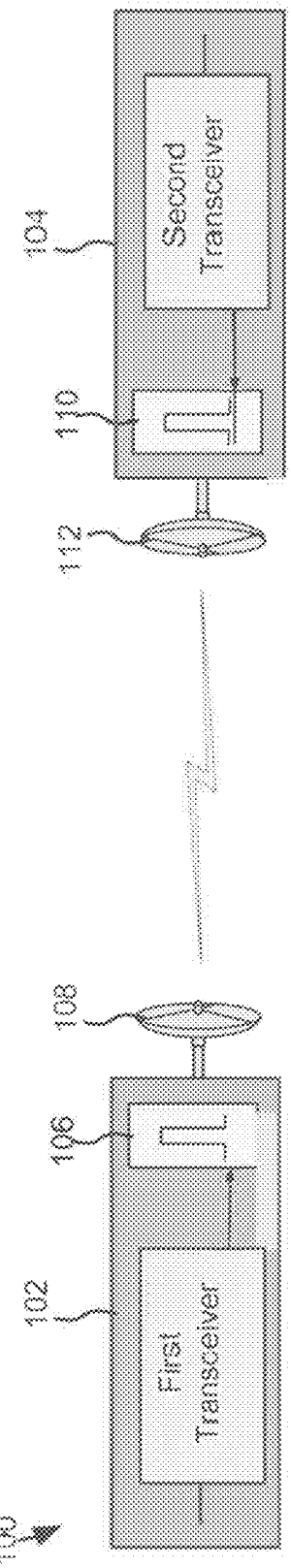
FIG. 1 depicts an example environment including transceiver radio frequency units (RFU) in some embodiments.

Some embodiments described herein provide simple and accurate phase and frequency synchronization across wireless links. Methods and systems are described that detect phase variations across wireless links. The proposed methodology may allow for the creation of a phase and frequency synchronized wireless network.

Some embodiments described herein includes methods and techniques that simplify detection of phase variations over that described regarding IEEE 1588v2 and may, in some embodiments, improve the accuracy of the phase offset calculation. The phase offset calculation may be used for phase synchronization.

In some embodiments, a phase offset is calculated as a relative difference between near-end and far-end units and is calculated on both sides of the wireless link independently. In some embodiments, before the offset calculation is calculated, frequency synchronization is completed and a time protocol counter may be at the data link layer on each side of the wireless link.

As discussed herein, the time protocol counter (e.g., precision time protocol (PTP)) on the data link layer on the near-end side of the wireless channel may be referred to as a "local time protocol counter" and the time protocol counter on the far-end side as a "remote time protocol counter."

While embodiments described herein may refer to the IEEE 1588v2 standard, it will be appreciated that embodiments described herein may utilize many different standards and many different protocols. In some embodiments, examples will be described showing an improvement over the IEEE 1588 V2 standard. As discussed herein, various techniques may be utilized in place of or in addition to any number of different protocols and standards (e.g., protocols and standards for frequency synchronization).

Further, as discussed herein, a "unit" may refer to the whole system connecting to other systems either with wired or wireless links.

If there are any additional time protocol counter(s) (e.g., PTP counters) on the unit (e.g., for timestamping Ethernet packets) then most or all of the time protocol counters (e.g., PTP counters) on each unit may be synchronized with each other. In various embodiments, time protocol counter synchronization on the unit is done after frequency synchronization process and before phase offset calculation process. In one example, a local 1PPS signal may be used to synchronize local PTP counters. It may not be relevant for some embodiments described herein which time protocol counter is a source for time protocol counter synchronization. This can be system dependent and/or defined by higher layer(s) of phase synchronization process. Further, initial phase information and master-slave direction may not be relevant for this method/technique.

In some embodiments, higher layer(s) of the phase synchronization process use the phase offset calculation of the particular wireless link to transfer phase synchronization across this wireless link. Higher layer(s) of the phase synchronization process may use the initial phase information to properly perform phase synchronization relative to the initial phase source. The higher layer(s) of the phase synchronization process may be aware of master-slave direction, if needed, by clock type. Direction change may be fast and simple as phase offset calculation may be simultaneously and independently available on each side of the wireless link.

Examples of the method/technique may be capable of phase offset calculation across the data link layer used to handle blocks of data packed into airframes (e.g., OSI layer 2). Airframes are used for transferring blocks of data across wireless links. There is a significant time variation between packets and how they are packed into blocks of data of airframe. This is one of the reasons why phase synchronization at the packet level does not perform as well for phase synchronization across wireless links.

Different embodiments may include any number of the following advantages over the 1588v.2 standard:

(1) Better precision and accuracy—two sides of the point-to-point wireless link (e.g., two microwave routers connected by a microwave radio link) may have better time synchronization precision and accuracy by using methods described herein compared to time-stamping of packets at the packet level (e.g., Ethernet packets). Packet level time synchronization on the prior art introduces additional scattering error (additional latency variation) as well as additional deviation error (additional asymmetrical latency) because there is a significant variable processing delay before packets can be packed into airframes.

(2) Additional statistical precision may be gained through averaging repeated measurements. With averaging measurement, variations may be reduced or minimized due to cross-clock-domain synchronization between asynchronous clock domains.

(3) The method/technique described herein may be independent of the PTP master-slave configuration. In various embodiments, both sides of the wireless point-to-point link calculate their own phase offset (e.g., near-end side calculates phase offset compared to far-end while far-end calculates its own phase offset compared to near-end). The absolute values of both offsets may be the same to the extent of measurement errors while one is a positive value and the other is negative value. This phase offset may be provided to the upper layer on both sides regardless of master-slave configuration. The upper layer may utilize the calculated phase offset in order to provide transport of phase synchronization. The upper layer may be aware of master-slave configuration, if needed, by clock type. Direction change of master-slave configuration may be fast and simple as phase offset calculation may be simultaneously and independently available on each side of the wireless link. However, the method/technique itself (or implementation of the method/technique) may be independent of master-slave configuration, which may make it an easier and more robust solution compared to solutions that depend on master-slave configuration.

(4) Independent of packet fragmentation. Various embodiments described herein may be independent of packet payload data including PTP timing packets (for IEEE 1588v2). When two or more point-to-point radio links are used in parallel from one point to another, then packet fragmentation (e.g., link aggregation like L1LA) may be used over these parallel links to optimize data traffic. This packet fragmentation process does not need to be PTP IEEE 1588v2 aware.

(5) Unaffected user data bandwidth. Some embodiments described herein may utilize transfer of local time-stamps and other required synchronization data between both sides of the wireless link to calculate the phase offset. While timestamps required for calculation may be taken close to each other with regards to time, the transfer of this timestamp information between both sides may not be time limited. Simple handshake may be used for this information exchange within the data space for control information, which may be available in every airframe, which may not affect user data bandwidth (user traffic).

FIG. 1 depicts an example environment 100 including transceiver radio frequency units (RFU) 102 and 104 in some embodiments. The transceiver RFUs 102 and 104 depicted in FIG. 1 are in wirelessly communication with each other. In various embodiments, the transceiver RFUs 102 and 104 communicate over microwave radio frequencies although it will be appreciated that transceiver RFUs 102 and 104 may communicate over any portion of the wireless spectrum (e.g., not limited to the microwave spectrum).

Further, although depicted as communicating directly to each other, each of the transceiver RFUs 102 and 104 may communicate via a tower or any other receivers, transmitters, and/or transceivers.

The transceiver RFU 102 includes a first transceiver, a waveguide 106, and an antenna 108. The transceiver RFU 104 includes a first transceiver, a waveguide 110, and an antenna 112.

In various embodiments, the transceivers RFUs 102 and 104 may correct for offset and phase utilizing systems and methods discussed herein.

Figure 2:
FIG. 2 is an example air frame structure in some embodiments.
Figure 2:
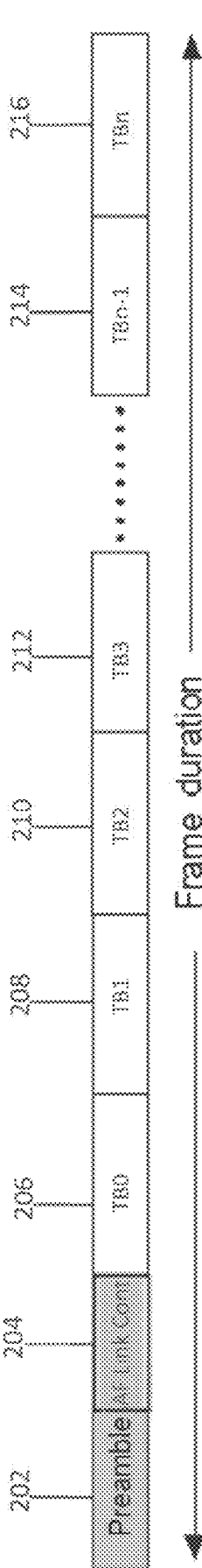

The transmission over a microwave path may be based on a continuous synchronous transmission of air frames separated by a preamble. FIG. 2 is an example air frame structure 200 in some embodiments. Such a transmission scheme may be called a Constant Bit Rate (CBR).

In some embodiments, every air frame starts with the preamble 202 which may be a sequence known to the receiver. In this example, the preamble 202 is followed by an Air Frame Link Control field 204, which contains control information defining the air frame 200. In various embodiments, the preamble 202 and the air frame link control field 204 are followed by blocks of QAM (or QPSK) symbols, called transport blocks (TB) 206-216. Transport blocks (e.g., transport blocks 206-216) may be containers for user data (e.g., Ethernet packets, TDM Payload, or the like) and other required control data (e.g., ACM, ATPC, AGC, control loops, or the like) exchanged mutually by microwave modems.

The size of those containers may depend on the current Adaptive Coding Modulation (ACM) state and on the configured framing choice. Adaptive coding modulation allows dynamic change of modulation and FEC level to accommodate for radio path fading which is typically due to weather changes on a transmission path. Benefits of ACM may include improved spectrum efficiency and improved link availability, particularly in wireless (e.g., microwave) links.

One of the disadvantages of changing the modulation level is that this changes the throughput of the wireless (e.g., microwave) link. Such change on the wireless path (or any wireless path segment) causes significant delay variation at the packet level. In one example, high PDV and asymmetry if the changes can occur only in one direction. Transport blocks (e.g., N*QAM Symbols) may also be used as the processing units for FFT operation and for further frequency domain processing. While discussion herein is directed to microwave communication, it will be appreciated that at least some embodiments and discussions herein may be applied to any wireless (e.g., radio frequency (RF)) communication.

The following includes some (not necessarily all) reasons for the complexity of obtaining exact timing of received and transmitted packets at the physical level of a radio interface:

The microwave radio interface operates on a transport block level as a basic data unit.

The transport block(s) require many stages of frequency and time domain processing before the payload can be decoded.

Varying throughput due to ACM activity.

Figure 3:
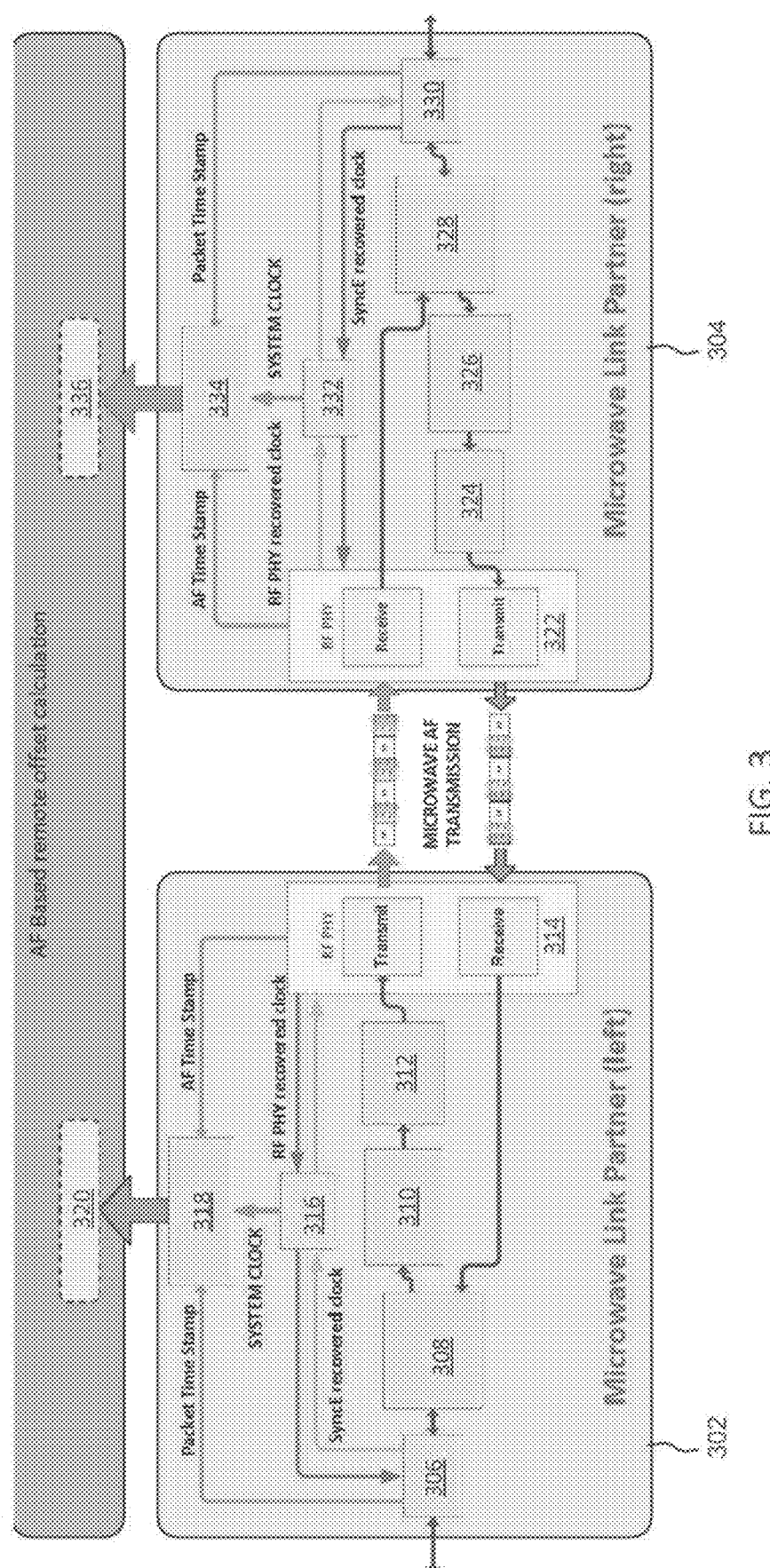
FIG. 3 depicts an environment including microwave link partners in communication over microwave channel in some embodiments.

FIG. 3 depicts an environment 300 including microwave link partners 302 and 304 in communication over microwave channel in some embodiments. The microwave link partners 302 and 304 may be or include transceivers, receivers, or transmitters. In some embodiments, the microwave link partner 302 may receive data to be transmitted over PHY 306.

The PHY 306 may be an Ethernet PHY (e.g., the data to be transmitted may be received over an ethernet cable). The PHY 306 may process and modulate the data into air frames (or any format) and provide the modulated data to the classification and routing module 308.

In various embodiments, systems and methods described herein utilize receiving and providing data over Ethernet cable using an Ethernet Physical Layer device (e.g., PHY 306). Packets and/or PTP packets may be received from a switch or router. In various embodiments, the PHY 306 may perform a timestamp at data ingress of the transceiver and PHY 314 may perform a timestamp at data (e.g., the airframe) egress. Similarly, the PHY 322 of the second microwave link partner 304 may timestamp when data (e.g., the airframe) is received over the microwave channel. In various embodiments, the PHY 330 may perform another timestamp at egress.

The classification and routing module 308 may direct data to be transmitted to the data packet queuing module 310 while directing data received from the radio frequency PHY 314 to the PHY 306. The data packet and queuing module 310 may control data flow (e.g., buffering and/or assist in load balancing) and provide the data to the scheduling module 312 which prepares the modulated data to be transmitted over the radio frequency PHY 314. The radio frequency PHY 314 may transmit the data to another microwave link partner (e.g., microwave link partner 304) and receive data. In various embodiments, the radio frequency PHY 314 communicates over a microwave spectrum.

It will be appreciated that the microwave link partner (e.g., 302) may down convert data (e.g., data received by a gigabit Ethernet PHY) to enable wireless transmission. The transceiver may up or down covert the data to be transmitted (e.g., to an intermediate frequency where further processing may occur and then to an RF frequency for transmission). Further, there may be elastic buffers to transfer or change the data speed to a lower seed. As a result, phase and offset are increasingly difficult to determine between devices across a wireless channel. Further, the radio may change modulation (e.g., in real-time).

The microwave link partner 304 may receive data from over the microwave channel by the radio frequency PHY 322 which may provide the received data to the classification and routing module 328 for routing and classification of the received data to the PHY 330. The PHY 330 may provide the data to another digital device via Ethernet. Similar to the microwave link partner 304, The PHY 330 of the microwave link partner 304 may be an ethernet PHY (e.g., the data to be transmitted may be received over an ethernet cable). The PHY 330 may process and modulate the data into air frames (or any format) and provide the modulated data to the classification and routing module 328. The classification and routing module 328 may direct data to be transmitted to the data packet queuing module 326. The data packet and queuing module 326 may control data flow (e.g., buffering and/or assist in load balancing) and provide the data to the scheduling module 324 which prepares the modulated data to be transmitted over the radio frequency PHY 322. The radio frequency PHY 322 may transmit the data to another microwave link partner (e.g., microwave link partner 302) and receive data. In various embodiments, the radio frequency PHY 322 communicates over a microwave spectrum.

Both microwave link partners 302 and 304 may include phase lock loops (PLLs) 316 and 332, respectively, to assist in recovery of clock signals using data received from over the wireless channel as described herein. The microwave link partners 302 and 304 may include system clocks 318 and 334, respectively, that may include different time domains.

Offset and phase synchronization module 320 may determine offset and phase synchronization for the microwave link partner 302 based on timestamps of the microwave link partners 302 and 304 as discussed herein. Similarly, offset and phase synchronization module 320 may determine offset and phase synchronization for the microwave link partner 304 based on timestamps of the microwave link partners 302 and 304 as discussed herein.

Figure 4:
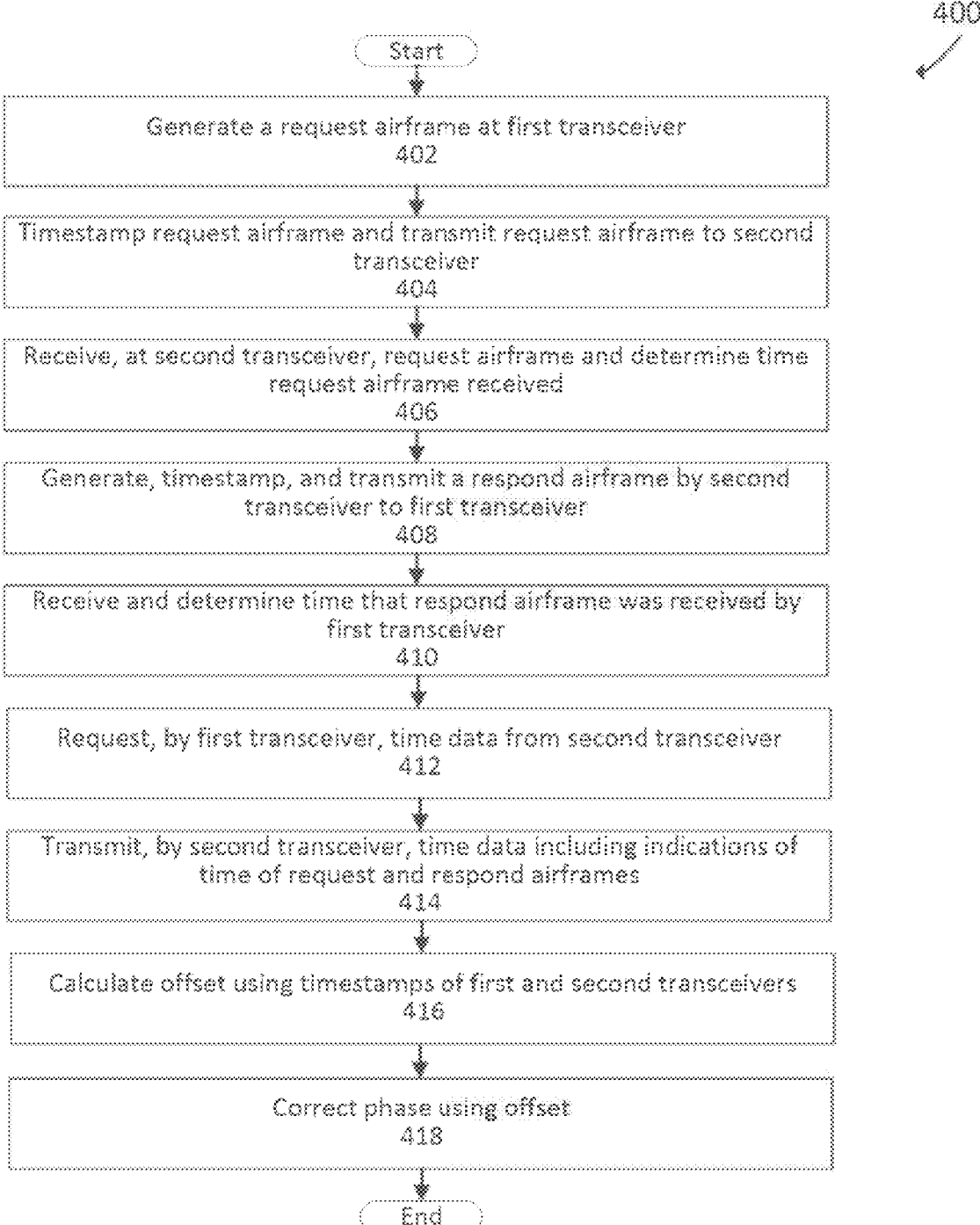
FIG. 4 depicts an example airframe exchange between a first transceiver and a second transceiver in some embodiments.
Figure 5:
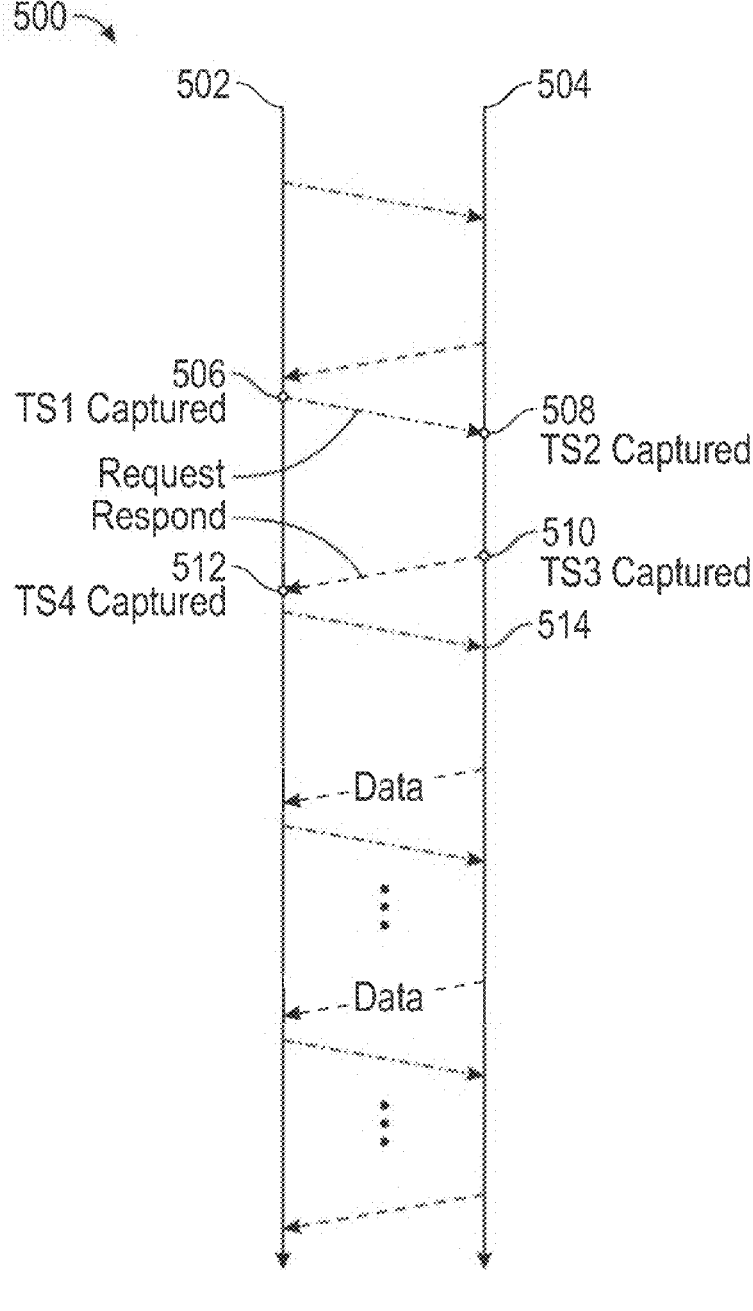
FIG. 5 depicts a data flow between the two transceivers in some embodiments.

FIG. 4 is a flowchart 400 that depicts an example airframe exchange between a first transceiver 502 and a second transceiver 504 (e.g., microwave link partners 302 and 304, respectively) in some embodiments. Airframes may be transferred in both directions between local and remote sides with a constant airframe period. In this example, the local side will be referred to as the first transceiver 502 and the remote side will be referred to as the second transceiver 504. Also in this example, the wireless channel is a microwave channel. FIG. 5 depicts a data flow 500 between the two transceivers 502 and 504 in some embodiments.

Timestamping of the airframe may be an independent process for radio egress and ingress directions and the timestamps. In various embodiments, timestamps may be related to airframes rather than to any specific data inside data blocks. This enables the possibility to have fixed latency from the point of timestamp in the near-end modem, over the air, to the point of timestamp in the far-end modem.

Phase offset between local and remote PTP counters on both sides of point-to-point wireless link may be calculated using four timestamps based on two airframes. To collect all four timestamps, the timestamping process of two airframes may be followed by a data exchange process. For the discussion herein, these two airframes may be named "request" and "respond" airframes.

In various embodiments, all airframes, regardless of how we call them, are intact from the traffic data point of view. The additional "channel" inside the airframe for may be utilized this method/technique. It may be desired that this channel takes as little additional bandwidth as possible. In the best case, it can be zero additional bandwidth if an existing channel can be re-used.

In step 402, the first transceiver 502 may mark an airframe as a request airframe 506. It will be appreciated that this airframe may be a PTP airframe, a time protocol airframe, or any other airframe.

In step 404, the first transceiver 502 (e.g., the radio frequency PHY 314) timestamps the request airframe as TS1 and transmits the request airframe 506 from the local side to the second transceiver (e.g., to the remote side (Unit 2) also called transceiver 504) of the point-to-point wireless link. In some embodiments, the first transceiver 502 determines a time TS1 and does not send the timestamp along with the request airframe 506.

In step 406, the second transceiver 504 determines the time and may determine the time that the request airframe was received (TS2) 508.

In step 408, the second transceiver 504 may become the responding side and may respond to this request by creating and transmitting an airframe (e.g., the first possible airframe) in the opposite direction. The responding airframe may be termed a "respond airframe" 510. The second transceiver 504 may determine a third time (TS3) that the respond airframe was sent. The second transceiver 504 may provide an indication of TS2 or TS3 within the respond airframe.

In step 410, the first transceiver 502 may receive the respond air frame and determine a time that the respond airframe was received as TS4 512.

In some embodiments, the respond airframe follows the request airframe as soon as possible in order to minimize or reduce errors introduced by wander frequency of the whole system. Wander frequency has a typical clock period of 100 ms while worst case delay between the request and respond airframes is only a few milliseconds but could be less.

The data exchange process may follow the timestamping process. In some embodiments, this may be the required process to calculate the phase offset, however, it is not time critical. This means that timestamps and other required synchronization data from the responding side may be transferred to the requesting side through several airframes. This may be done within an existing channel built inside the airframe for timestamping purposes. Using the same channel may not be a requirement but it may be desired so that no additional bandwidth is used.

In step 412, one side (e.g., the first transceiver or the second transceiver) may request time or counter data 514 from the other side (e.g., the first transceiver 502 may request synchronization data 514 from the second transceiver 504 or the second transceiver 504 may request synchronization data from the first transceiver 502) in step 414. The responding side may mark the airframes (e.g., as "data" airframes). The receiving side may provide time indications that indicate times that the requesting side does not have. For example, the second transceiver may provide, within a response to the request, time indication indicating when the request airframe was received (TS2) and/or a time that the respond airframe was sent (TS3). Similarly, the first transceiver may provide time indication indicating when the request airframe was sent (TS1) and/or a time that the respond airframe was received (TS4).

In step 416, the requesting side may calculate the offset (e.g., using the offset and phase synchronization module 320 or 336). In various embodiments, offset is calculated on the requesting side after collecting the timestamps and other required synchronization data:

$$\text{Offset} = \frac{(TS1 + TS4 - TS3 - TS2)}{2} \pm \frac{Asy}{2}$$

Any asymmetry on the round trip radio link path (marked as "Asy") influences the calculation as seen from the formula. Asymmetry may be reduced, minimized, or eliminated with the possibility of characterizing and/or measuring each part in the radio link between both sides. If this data can be provided by hardware (HW), then no additional measurements regarding asymmetry may be required.

Value(s) representing asymmetry may be introduced at the time of establishing the wireless link (e.g., preamble locking) while other value(s) (e.g., another part) may be introduced by having different modulations for radio egress and ingress directions of the selected bandwidth.

Asymmetry may be calculated based on information from the modem about transmit and receive FIFOs. An FPGA may calculate the asymmetry.

In step 418, the requesting transceiver may correct phase based on the offset (e.g., the Offset and phase synchronization module 320 or 336 may correct phase using the offset). In various embodiments, the calculated phase offset information is a result at the physical layer and is further available to the higher layer. The higher layer may use this phase offset information to transport the phase synchronization on the packet level. The higher layer may also initiate the phase offset calculation process. There may be also the possibility that the higher layer repeats this process in order to track any changes, especially when modulations are changed.

Figure 6:
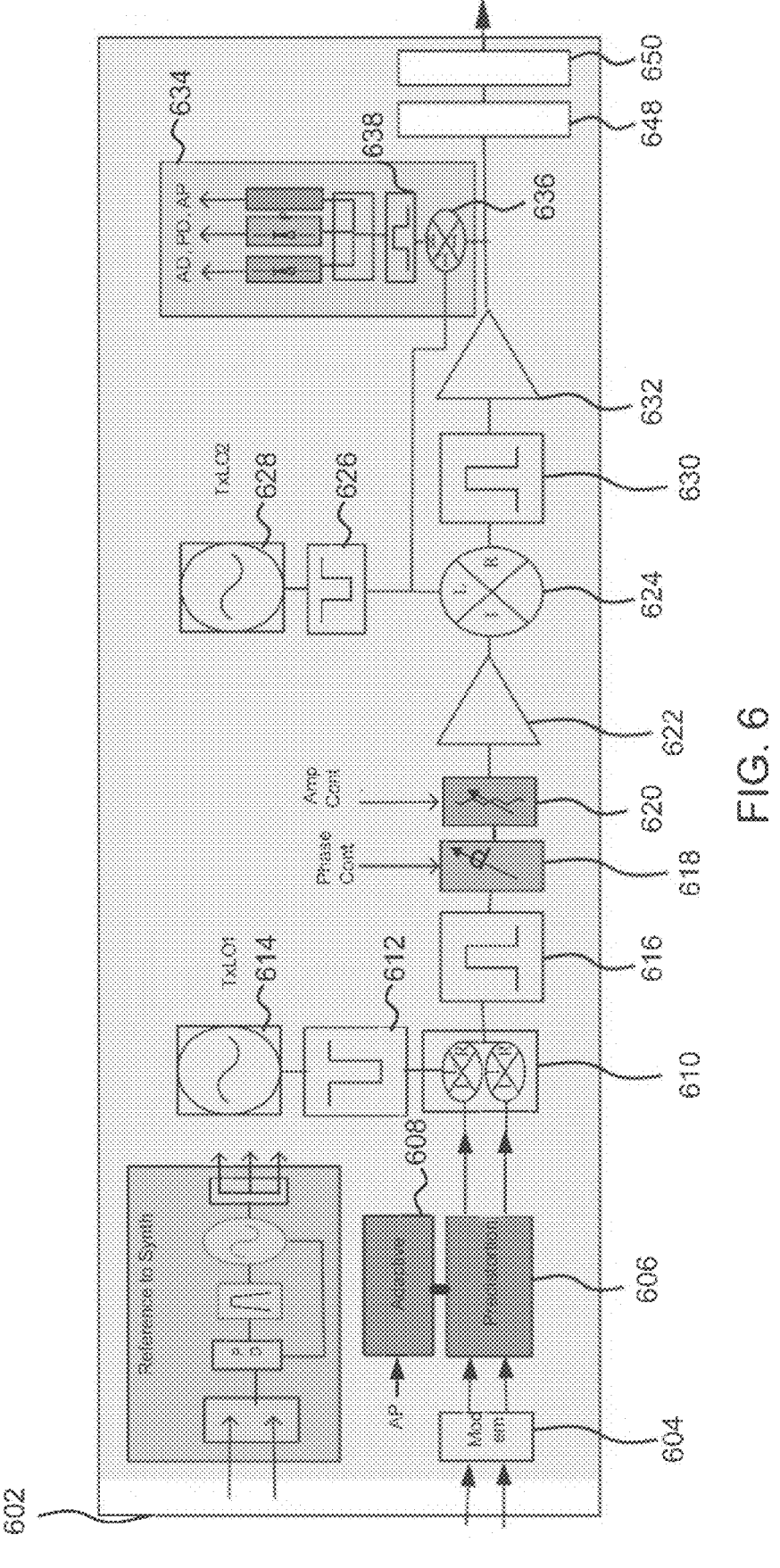
FIG. 6 depicts an example transmitting radio frequency unit in some embodiments.

FIG. 6 depicts an example transmitting radio frequency unit 602 in some embodiments. Although a transmitter is described in FIG. 6, it will be appreciated that all or parts of the transmitter of FIG. 6 may be a part of the first transceiver 602 as discussed herein. In some embodiments, the transmitting radio frequency unit expresses components and a logical flow of transmitting information over a wireless channel. Any transceiver including any functionality may be utilized in performing all or part of the systems and/or methods described herein.

The transmitting radio frequency unit 602 (e.g., radio link partner 302 or radio link partner 304) may comprise a modem module 604, a predistortion module 606, an adaptive module 608, mixer modules 610, 624 and 636, filter modules 612, 616, 626, 630 and 638, oscillator modules 614 and 628, a phase adjuster 618, an automatic gain control (AGC) module 620, amplification/attenuation module 622, a power amplifier 632, a signal quality module 634, waveguide filter 648, and waveguide 650.

In some embodiments, the transceiver 602 includes a digital signal processor (e.g., DSP). The DSP is any processor configured to provide one or more signals to the modem module 604. The digital signal processor (DSP) may comprise a digital signal processor, or another digital device, configured to receiving a source signal intended for transmission and converting the source signal to corresponding in-phase (I) and quadrature (Q) signals. For instance, the DSP may be implemented using a digital device (e.g., a device with a processor and memory). Instructions stored on the storage system may instruct the DSP to receive an input signal from a communications network interface, convert the input signal to corresponding the in-phase (I) and quadrature (Q) signals, and provide the corresponding in-phase (I) and quadrature (Q) signals.

The modem module 604 may be any modem configured to receive one or more signals to be transmitted. The modem module 604, in one example, may receive an in-phase (I) and quadrature (Q) signals and provide the signals to the pre-distortion module 606. The modem module 604 may comprise a modem device, or another digital device. The modem module 604 may be configured to receive in-phase (I) and quadrature (Q) signals and modulate the in-phase (I) and quadrature (Q) signals to encode the information.

The predistortion module 606 may receive the signal from the modem module 604 and improve the linearity of the signal. In various embodiments, the predistortion module 606 inversely models gain and phase characteristics and produces a signal that is more linear and reduces distortion. In one example, "inverse distortion" is introduced to cancel non-linearity. The predistortion module 606 may receive a predistortion control signal based on a comparison of a signal from the power amplifier 632. In one example, the predistortion module 606 may receive a signal based on the power amplifier 632 in order to add distortion to an input signal to the power amplifier 632 to cancel (e.g., non-linear) noise generated by the power amplifier 632.

The adaptive module 608 may provide the predistortion control signal based on the sample from the signal quality module 634 described herein. The predistortion module 606 may provide the I and Q signals to the mixer module 610.

The mixer module 610, filter module 612, and the oscillator module 614 may represent an upconverter configured to upconvert the signals to an intermediate frequency signal. Similarly, the mixer module 624, filter module 626, and oscillator module 628 also may represent an upconverter configured to further upconvert the signal to an RF signal. Those skilled in the art will appreciate that there may be any number of upconverters configured to upconvert the signals within the transceiver radio frequency unit 602.

The mixer modules 610 and 624 may comprise mixers configured to mix the signal(s) provided by the modem with one or more other signals. The mixer modules 610 and 624 may comprise many different types of mixers with many different electrical properties. In one example, the mixer 610 mixes I and Q signals received from the predistortion module 606 with the filtered oscillating signal from the filter module 612 and the oscillator module 614. In another example, the mixer module 624 mixes a signal received from the amplifier/attenuator module 622 with the filtered oscillating signal from the filter module 626 and the oscillator module 628.

The filter modules 612, 616, 626, and 630 may comprise filters configured to filter the signal. The filter modules 612, 616, 626, and 630 may comprise many different types of filters (e.g., bandpass filter, low pass filter, high pass filter, or the like) with many different electrical properties. In one example, the filter module 612 may be a band pass filter configured to filter the oscillation signal (or components of the signal) provided from the oscillator module 614. Similarly, filter modules 612, 616, 626, and 630 may filter signals (or components of the signals) from the oscillator module 614, the oscillator module 628, the mixer module 610, or the mixer module 624, respectively.

The oscillator modules 614 and 628 may comprise oscillators configured to provide an oscillating signal that may be used to upconvert the signal. The oscillator modules 614 and 628 may comprise any kind of oscillator with any different electrical properties. In one example, the oscillator module 614 provides an oscillating signal to the filter module 612. The oscillator module 628 may provide an oscillating signal to the filter module 626.

The oscillator modules 614 and 628, either individually or together, may be local or remote. In one example, the oscillating module 614 and/or the oscillating module 628 may be remotely located and configured to provide an oscillating signal to one or more transmitting radio frequency units. In some embodiments, a single oscillating module may provide an oscillating signal to both the mixer module 610 and 624, respectively (e.g., optionally via a filter). In one example, the oscillator signal from the oscillator module may be altered (e.g., oscillation increased or decreased) and provided to a different part of the circuit.

The signal quality module 634 may be configured to generate a phase control signal to control the phase of a processed signal. In one example, the signal quality module 634 receives the upconverted RF signal from the power amplifier 632 and mixes the signal with the filtered oscillator signal or the upconverted signal from the second upconverter (e.g., mixer module 624, filter module 626, and oscillator module 628). The signal quality module 634 may filter the signal and compare the filtered, mixed signal with a predetermined phase value to generate a phase control signal based on the comparison.

The phase adjuster 618 may comprise a variable phase control circuit configured to increase or decrease the phase of the signal to be transmitted. The phase adjuster 618 may comprise any different type of phase adjuster or phase shifter with different electrical properties. In one example, the phase adjuster 618 increases or decreases the phase of the signal received from the filter module 616. The phase adjuster 618 may adjust the phase of the signal based on the phase control signal from the signal quality module 634.

The phase adjuster 618 may include one or more components. For example, the phase adjuster 618 may comprise one or more phase control elements.

The AGC module 620 may comprise an automatic gain control (AGC) circuit configured to increase or decrease the gain of the signal received from the phase adjuster 618. The AGC module 620 may comprise many different types of AGCs with many different electrical properties. In one example, the AGC module 620 increases or decreases the gain of the signal received from the phase adjuster 618. The AGC module 620 may adjust the gain of the signal based on the gain control signal.

In various embodiments, in order to adjust the phase of the signal or the amplitude of the signal, the signal quality module 634 may provide control signals to adjust the in-phase (I) and quadrature (Q) signals to achieve a desired adjustment. For example, in order to adjust the phase or amplitude of the signal, the signal quality module 634 may utilize the digital signal DSP to adjust the in-phase (I) and quadrature (Q) signals provided to the modem module 604 to achieve the desired adjustment based on the predetermined phase value and/or the predetermined amplitude value. In another example, in some embodiments, the signal quality module 634 may utilize the modem module 604 to adjust the in-phase (I) and quadrature (Q) signals provided to the predistortion module 606.

The amplification/attenuation module 622 may comprise an amplifier and/or an attenuator configured to amplify and/or attenuate a signal. The amplification/attenuation module 622 may be any kind of amplifier(s) and/or attenuator(s). Further, the amplification/attenuation module 622 may comprise amplifiers and/or attenuators with any kind of electrical properties. The power amplifier 632 may amplify the signal to be transmitted. It will be appreciated that the power amplifier 632 may add noise to the signal to be transmitted (e.g., nonlinear noise) which may be dynamically canceled through the addition of distortion in the signal to be transmitted by the predistortion module 606.

In some embodiments, the amplifier/attenuator module 622 receives a signal from the AGC module 620. The amplifier/attenuator module 622 may amplify or attenuate the signal. Further, the power amplifier 632 may amplify power of the signal (or components of the signal) after the signal has been upconverted by the mixer module 624, the filter module 626, and the oscillator module 628. The power amplifier 632 may then provide the signal to the signal quality module 634 and/or the waveguide filter 648.

The transceiver radio frequency unit 602 may comprise the waveguide filter 648, the waveguide 650, and/or a diplexer. The waveguide filter 648 may be any filter coupled to the waveguide 650 and configured to filter the electromagnetic waves (e.g., remove noise). The waveguide 650 may provide the signal to the antenna via a diplexer. The diplexer may provide the signal to the antenna. The waveguide 650 may be any waveguide kind or type of waveguide.

In various embodiments, by utilizing open loop calibration, the total phase and amplitude for the whole transmitter path may be calibrated from I and Q input to the output of the power amplifier 632. In some embodiments, by calibration and look-up tables, the phase and amplitude may be accurately detected, controlled, and set at the Tx output directly or through adjusting I and Q signals at the input. The phase offset calculation, as discussed herein, may be processed at the PHY level (as opposed to the packet level). With PHY level processing, at least some systems and methods described utilize the block data level (block level) of the airframe, the symbol level of the airframe, or any combination of both.

Blocks of data may be mapped by the modem into symbols to be transmitted by the radio and are de-mapped by the modem using symbols received from the radio. The start of the airframe may be timestamped locally either at the block level or at the symbol level. In various embodiments, both sides of a wireless link timestamp the airframe in the same manner to provide a symmetrical environment from the time point of view.

Figure 7:
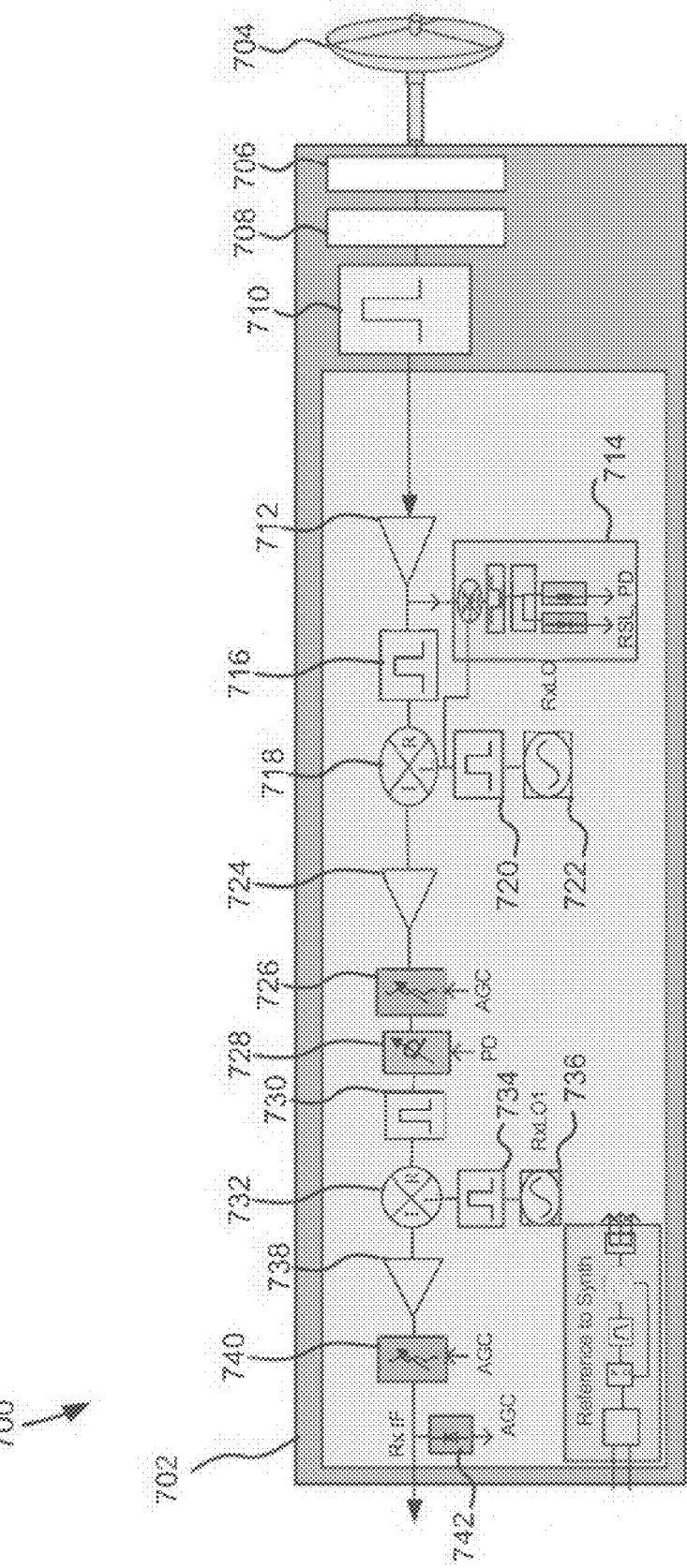
FIG. 7 is a block diagram of an example transceiver RFU in some embodiments.

FIG. 7 is a block diagram 700 of an example transceiver RFU 702 in some embodiments. Although a receiver is described in FIG. 7, it will be appreciated that all or parts of the transmitter of FIG. 7 may be a part of the second transceiver 504 as discussed herein. In some embodiments, the receiving radio frequency unit 702 expresses components and a logical flow of transmitting information over a wireless channel. Any transceiver including any functionality may be utilized in performing all or part of the systems and/or methods described herein.

Block diagram 700 comprises an antenna 704 and a diplexer 710 coupled to the waveguide 706. The waveguide 706 may provide the signal from the antenna 704 to the diplexer 710 via a waveguide filter 708. The diplexer 710 may provide the signal to the receiving radio frequency unit 702. In some embodiments, the receiving radio frequency unit 702 may comprise the waveguide 706, the waveguide filter 708, and/or the diplexer 710.

The waveguide 706 may be any waveguide kind or type of waveguide. For example, the waveguide 706 may be hollow or dielectric. In some embodiments, the waveguide 706 comprises a rectangular to circular waveguide. The waveguide filter 708 may be any filter coupled to the waveguide 706 and configured to filter the electromagnetic waves from the waveguide 706 (e.g., remove noise).

In various embodiments, the receiving radio frequency unit 702 is configured to receive a signal from the antenna 704 via the diplexer 710 and adjust the phase of the received signal. The phase of the received signal may be adjusted based on a comparison of the phase of the signal and a predetermined phase value. In some embodiments, the receiving radio frequency unit 702 may also be configured to adjust the gain of the received signal. In one example, the receiving radio frequency unit 702 may adjust the gain of the received signal based on a comparison of a gain of the received signal with a predetermined gain value.

The receiving radio frequency unit 702 may be any receiver including, but not limited to, a traditional heterodyne receiver with RX intermediate frequency (IF) output. Those skilled in the art will appreciate that multiple receiving radio frequency units may be used to receive the same signal (e.g., signals containing the same information provided by a wireless communication source). Each receiving radio frequency unit may adjust the phase of the received signal, respectively, based on the same predetermined phase value. Similarly, each receiving radio frequency unit may adjust the gain of the received signal, respectively, based on the same gain value. As a result, the phase and gain of the signal from each receiving radio frequency unit may be the same or substantially similar (e.g., the phase and gain of the signals may be identical). The signals may be subsequently combined to strengthen the signal, increase dynamic range, and/or more accurately reproduce the information that was wirelessly transmitted.

The receiving radio frequency unit 702 may comprise amplification/attenuation modules and/or power amplifiers 712, 724, and 738, filter modules 716, 720, 730, and 734 mixer modules 718 and 732, oscillator modules 722 and 736, phase control module 714, automatic gain control modules 726, 740, and 742, and variable phase module 728.

The amplification/attenuation modules 712, 724, and 738 may comprise an amplifier and/or an attenuator configured to amplify and/or attenuate a signal. The amplification/attenuator modules 712, 724, and 738 may be any kind of amplifiers and/or attenuators. Further, the amplification/attenuator modules 712, 724, and 738 may each comprise amplifiers and/or attenuators with any kind of electrical properties.

In some embodiments, the amplifier/attenuator module 712 receives a signal via the antenna 704 and the diplexer 710. The amplifier/attenuator module 712 may be a low noise amplifier configured to amplify the signal (or components of the signal) before providing the signal to the filter module 716 and the phase control module 714. Further, the amplifier/attenuator module 724 may attenuate the signal (or components of the signal) after the signal has been down-converted by the mixer module 718, the filter module 720, and the oscillator module 722. The amplifier/attenuator module 724 may then provide the signal to the automatic gain control 726. The amplification/attenuator module 738 may attenuate the signal (or components of the signal) after the signal has been downconverted by the mixer 732, the filter module 734, and the oscillator module 736. The amplifier/attenuator module 738 may then provide the signal to the automatic gain control 740.

Those skilled in the art will appreciate that each of the amplifier/attenuator modules 712, 724, and 738 may be the same as one or more other amplifier/attenuator modules. For example, amplifier/attenuator modules 712 and 724 may both be amplifiers sharing the same electrical properties while amplifier/attenuator module 738 may be an attenuator. In another example, amplifier/attenuator modules 712 and 724 may both be amplifiers but have different electrical properties.

Each amplifier/attenuator module 712, 724, and 738 may include one or more components. For example, the amplifier/attenuator module 712 may comprise one or more amplifiers and/or attenuators.

The filter modules 716, 720, 730, and 734 may comprise filters configured to filter the signal. The filter modules 716, 720, 730, and 734 may comprise many different types of filters (e.g., bandpass filter, low pass filter, high pass filter, or the like) with many different electrical properties. In one example, the filter module 716 may be a band pass filter configured to filter the signal (or components of the signal) received from the amplification/attenuation module 712 before providing the signal to the mixer module 718. Similarly, filter modules 720, 730, and 734 may filter signals (or components of the signals) from the oscillator module 722, the phase adjuster 728, and the oscillator module 736, respectively.

Those skilled in the art will appreciate that each of the filter modules 716, 720, 730, and 734 may be the same as one or more other filter modules. For example, filters module 716 and 720 may both be filters sharing the same electrical properties while filter module 730 may be another kind of filter. In another example, filters module 716 and 720 may both be filters of a similar type but have different electrical properties.

Each filter modules 716, 720, 730, and 734 may include one or more components. For example, the filter modules 716 may comprise one or more filters.

The mixer modules 718 and 732 may comprise mixers configured to mix the signal received from the antenna with one or more other signals. The mixer modules 718 and 732 may comprise many different types of mixers with many different electrical properties. In one example, the mixer 718 mixes a signal received from the filter module 716 with the filtered oscillating signal from the filter module 720 and the oscillator module 722. In another example, the mixer module 732 mixes a signal received from the filter module 730 with the filtered oscillating signal from the filter module 734 and the oscillator module 736.

Those skilled in the art will appreciate that each of the mixer modules 718 and 732 may be the same as one or more other mixer modules. For example, mixer modules 718 and 732 may both be mixers sharing the same electrical properties or, alternately, the mixer modules 718 and 732 may be another kind of mixer and/or with different electrical properties.

Each mixer modules 718 and 732 may include one or more components. For example, the mixer module 718 may comprise one or more mixers.

Figure 8:
FIG. 8 is an example diagram depicting a simplified Finite State Machine (FSM) as one of the possible implementations of the data exchange process.
Figure 8:

FIG. 8 is an example diagram depicting a simplified Finite State Machine (FSM) as one of the possible implementations of the data exchange process. Note that timestamping of airframes is done in this example with regards to the state of the FSM and with regard to the received airframes.

Each side of wireless link may start its own process of phase offset calculation and that they may be independent between each other. From the time point of view, they can start simultaneously or not. From the data point of view, each side may collect its own timestamps for calculating phase offset. It may not be relevant for this method/technique which side starts first.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A method comprising:

receiving, at a first transceiver, a first airframe from a second transceiver over a wireless link of a network, the first airframe including a first time indication indicating a first time TS1 that the first airframe was transmitted to the first transceiver, the first transceiver and the second transceiver including a first and second counters, respectively;

timestamping a second time indication indicating a second time TS2 that the first airframe was received;

generating a respond airframe and including within the respond airframe a third time indication indicating a third time TS3 that the respond airframe is to be transmitted to the second transceiver;

transmitting the respond airframe to the second transceiver;

receiving, from the second transceiver, a fourth time indication indicating a fourth time TS4;

calculating, by the first transceiver, a counter offset using the first time, second time, third time, and fourth time as follows:

$$\text{counter offset} = \frac{(TS1 + TS4 - TS3 - TS2)}{2};$$

calculating, by the first transceiver, a phase offset based on the counter offset, the calculating including:

determining asymmetry (ASY) in the wireless link, the asymmetry (ASY) in the wireless link comprising round trip radio link path asymmetry corresponding to different modulations for radio ingress and egress based on adaptive coding modulation (ACM) associated with one or more of the first airframe or the response airframe, and applying the following:

$$\text{phase offset} = \frac{(TS1 + TS4 - TS3 - TS2)}{2} \pm \frac{Asy}{2};$$

and correcting, by the first transceiver, a phase of the first transceiver based on the calculated phase offset, wherein the calculated phase offset is a result at a physical layer and is caused to be made available to higher layers.

2. The method of claim 1, where the first and second counters are synchronized with each other before the counter offset is calculated.

3. The method of claim 2, wherein the first counter is a precision time protocol counter.

4. The method of claim 1, where the first transceiver and the second transceiver have synchronized frequencies.

5. The method of claim 1, wherein the first transceiver generates and transmits the respond airframe after receiving the first airframe.

6. The method of claim 1, wherein the first transceiver transmits a timestamp information request to the second transceiver after the respond airframe is received.

7. The method of claim 1, further comprising:

receiving from the first transceiver, at least the second time indication;

calculating, by the second transceiver, a counter offset using the first time, second time, third time, and fourth time as follows:

$$\text{counter offset} = \frac{(TS1 + TS4 - TS3 - TS2)}{2};$$

calculating, by the second transceiver, a phase offset based on the counter offset; and correcting, by the second transceiver, a phase of the second transceiver.

8. The method of claim 7, where calculating the phase offset by the first transceiver is not synchronized with calculating the phase offset by the second transceiver.

9. The method of claim 1, wherein the wireless link is a microwave link.

10. The method of claim 1, wherein the first transceiver and the second transceiver each include a phase lock loop configured to assist in recovery of clock signals using data received over the wireless link of the network.

11. A method comprising:

generating, by a first transceiver, a first airframe to be sent to a second transceiver over a wireless link of a network, the first airframe including a first time indication indicating a first time TS1 that the first airframe is to be transmitted by the first transceiver, the first transceiver and the second transceiver including a first and second counters, respectively;

transmitting the first airframe to the second transceiver;

receiving a respond airframe from the second transceiver, the respond airframe including within the respond airframe a third time indication indicating a third time TS3 that the respond airframe is to be transmitted to the first transceiver;

determining a fourth time indication indicating a fourth time TS4 that the respond airframe was received;

receiving, from the second transceiver, a second time indication indicating a second time TS2 that the first airframe was received by the second transceiver;

calculating, by the first transceiver, a counter offset using the first time, second time, third time, and fourth time as follows:

$$\text{counter offset} = \frac{(TS1 + TS4 - TS3 - TS2)}{2};$$

calculating, by the first transceiver, a phase offset based on the counter offset, the calculating including:

determining asymmetry (ASY) in the wireless link, the asymmetry (ASY) in the wireless link comprising asymmetry on a round trip radio link path asymmetry corresponding to different modulations for radio ingress and egress based on adaptive coding modulation (ACM) associated with one or more of the first airframe or the response airframe, and applying the following:

$$\text{phase offset} = \frac{(TS1 + TS4 - TS3 - TS2)}{2} \pm \frac{Asy}{2};$$

and correcting, by the first transceiver, a phase of the first transceiver based on the calculated phase offset, wherein the calculated phase offset is a result at a physical layer and is caused to be made available to higher layers.

12. The method of claim 11, where the first and second counters are synchronized with each other before the counter offset is calculated.

13. The method of claim 12, wherein the first counter is a precision time protocol counter.

14. The method of claim 11, where the first transceiver and the second transceiver have synchronized frequencies.

15. The method of claim 11, wherein the first transceiver transmits a timestamp information request to the second transceiver after the respond airframe is received.

16. The method of claim 11, further comprising:
providing to the second transceiver, at least the fourth time indication;
calculating, by the second transceiver, a counter offset using the first time, second time, third time, and fourth time as follows:

$$\text{counter offset} = \frac{(TS1 + TS4 - TS3 - TS2)}{2};$$

calculating, by the second transceiver, a phase offset based on the counter offset; and
correcting, by the second transceiver, a phase of the second transceiver.

17. The method of claim 16, where calculating the phase offset by the first transceiver is not synchronized with calculating the phase offset by the second transceiver.

18. The method of claim 11, wherein the first transceiver and the second transceiver each include a phase lock loop configured to assist in recovery of clock signals using data received over the wireless link of the network.

19. A system comprising:
a first transceiver including memory and a processor, the first transceiver configured to:
receive a first airframe from a second transceiver over a wireless link of a network, the first airframe including a first time indication indicating a first time TS1 that the first airframe was transmitted to the first transceiver, the first transceiver and the second transceiver including a first and second counters, respectively;
timestamp a second time indication indicating a second time TS2 that the first airframe was received;
generate a respond airframe and including within the respond airframe a third time indication indicating a third time TS3 that the respond airframe is to be transmitted to the second transceiver;
transmit the respond airframe to the second transceiver;
receive, from the second transceiver, a fourth time indication indicating a fourth time TS4;
calculate a counter offset using the first time, second time, third time, and fourth time as follows:

$$\text{counter offset} = \frac{(TS1 + TS4 - TS3 - TS2)}{2};$$

calculate a phase offset based on the counter offset, the calculating including:
determining asymmetry (ASY) in the wireless link, the asymmetry (ASY) in the wireless link comprising asymmetry on a round trip radio link path asymmetry corresponding to different modulations for radio ingress and egress based on adaptive coding modulation (ACM) associated with one or more of the first airframe or the response airframe, and
applying the following:

$$\text{phase offset} = \frac{(TS1 + TS4 - TS3 - TS2)}{2} \pm \frac{Asy}{2};$$

and
correct a phase of the first transceiver based on the calculated phase offset, wherein the calculated phase offset is a result at a physical layer and is caused to be made available to higher layers.

20. A system comprising:
a first transceiver including memory and a processor, the first transceiver configured to:
generate a first airframe to be sent to a second transceiver over a wireless link of a network, the first airframe including a first time indication indicating a first time TS1 that the first airframe is to be transmitted by the first transceiver, the first transceiver and the second transceiver including a first and second counters, respectively;
transmit the first airframe to the second transceiver;
receive a respond airframe from the second transceiver, the respond airframe including within the respond airframe a third time indication indicating a third time TS3 that the respond airframe is to be transmitted to the first transceiver;
determine a fourth time indication indicating a fourth time TS4 that the respond airframe was received;
receive, from the second transceiver, a second time indication indicating a second time TS2 that the first airframe was received by the second transceiver;
calculate a counter offset using the first time, second time, third time, and fourth time as follows:

$$\text{counter offset} = \frac{(TS1 + TS4 - TS3 - TS2)}{2};$$

calculate a phase offset based on the counter offset, the calculating including:
determining asymmetry (ASY) in the wireless link, the asymmetry (ASY) in the wireless link comprising asymmetry on a round trip radio link path asymmetry corresponding to different modulations for radio ingress and egress based on adaptive coding modulation (ACM) associated with one or more of the first airframe or the response airframe, and
applying the following:

$$\text{phase offset} = \frac{(TS1 + TS4 - TS3 - TS2)}{2} \pm \frac{Asy}{2};$$

and
correct a phase of the first transceiver based on the calculated phase offset, wherein the calculated phase offset is a result at a physical layer and is caused to be made available to higher layers.

* * * * *